United States Patent
Wysocki

(10) Patent No.: US 10,350,796 B2
(45) Date of Patent: Jul. 16, 2019

(54) METHOD FOR ATTACHING METALLIC FLANGES TO THERMAL PLASTIC DUCTS

(71) Applicant: Gary R. Wysocki, Somers, CT (US)

(72) Inventor: Gary R. Wysocki, Somers, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 182 days.

(21) Appl. No.: 14/434,659

(22) PCT Filed: Oct. 9, 2012

(86) PCT No.: PCT/US2012/059326
§ 371 (c)(1),
(2) Date: Apr. 9, 2015

(87) PCT Pub. No.: WO2014/058413
PCT Pub. Date: Apr. 17, 2014

(65) Prior Publication Data
US 2015/0273738 A1    Oct. 1, 2015

(51) Int. Cl.
*B29C 43/18* (2006.01)
*F16L 33/34* (2006.01)
(Continued)

(52) U.S. Cl.
CPC .............. *B29C 43/18* (2013.01); *B29C 65/02* (2013.01); *B29C 65/56* (2013.01);
(Continued)

(58) Field of Classification Search
None
See application file for complete search history.

(56) References Cited

U.S. PATENT DOCUMENTS 2,942,748 A * 6/1960 Anderson ........... B29C 65/0672
156/294
3,061,503 A * 10/1962 Gould ................... B29C 65/344
139/425 R (Continued)

FOREIGN PATENT DOCUMENTS

FR    1133731 A    4/1957
GB    1382580      2/1975
(Continued)

OTHER PUBLICATIONS

Notification of Transmittal of the International Search Report and the Written Opinion of the International Searching Authority, of The Declaration for PCT/US/2012/59326; dated Jan. 22, 2013; pp. 1-17.

(Continued)

*Primary Examiner* — Edmund H Lee
(74) *Attorney, Agent, or Firm* — Cantor Colburn LLP

(57) ABSTRACT

A method is provided for connecting a fitting to a reinforced thermoplastic duct including inserting a first end of the fitting having a plurality of barbs into an end of the duct. A clamp is installed around the duct. The duct is heated to a temperature greater than a glass transition temperature of a thermal plastic material used to form the duct. The duct is restructured to include a plurality of protrusions positioned between the plurality of barbs of the fitting.

10 Claims, 6 Drawing Sheets

(51) Int. Cl.
*F16L 47/24* (2006.01)
*H02G 3/06* (2006.01)
*B29C 65/78* (2006.01)
*B29C 65/00* (2006.01)
*B29C 65/02* (2006.01)
*B29C 65/56* (2006.01)
*B29L 31/24* (2006.01)

(52) U.S. Cl.
CPC ...... *B29C 65/7841* (2013.01); *B29C 66/0342* (2013.01); *B29C 66/3032* (2013.01); *B29C 66/30325* (2013.01); *B29C 66/3494* (2013.01); *B29C 66/5344* (2013.01); *B29C 66/612* (2013.01); *B29C 66/721* (2013.01); *B29C 66/7392* (2013.01); *B29C 66/742* (2013.01); *B29C 66/81471* (2013.01); *B29C 66/8322* (2013.01); *B29C 66/91411* (2013.01); *B29C 66/91943* (2013.01); *F16L 33/34* (2013.01); *F16L 47/24* (2013.01); *H02G 3/06* (2013.01); *B29C 66/723* (2013.01); *B29C 66/7212* (2013.01); *B29C 66/73115* (2013.01); *B29C 66/73117* (2013.01); *B29C 66/91945* (2013.01); *B29L 2031/24* (2013.01)

(56) References Cited

U.S. PATENT DOCUMENTS

| | | | | |
|---|---|---|---|---|
| 3,819,437 A | * | 6/1974 | Paine | B29C 65/08 156/73.4 |
| 4,508,368 A | * | 4/1985 | Blumenkranz | B29C 65/342 156/294 |
| 4,712,809 A | * | 12/1987 | Legris | B29C 65/0672 156/73.5 |
| 4,756,465 A | * | 7/1988 | Pranch | B23K 20/129 156/73.5 |
| 4,865,674 A | * | 9/1989 | Durkin | B29C 66/341 156/158 |
| 5,203,943 A | * | 4/1993 | Nornberg | A61M 39/12 156/245 |
| 5,336,351 A | * | 8/1994 | Meyers | B29C 37/0082 156/158 |
| 2002/0084650 A1 | | 7/2002 | Campbell et al. | |
| 2004/0088849 A1 | * | 5/2004 | Reynolds, Jr. | F16L 33/00 29/419.1 |
| 2004/0239007 A1 | * | 12/2004 | Arai | B29C 65/1654 264/482 |
| 2005/0140052 A1 | * | 6/2005 | Brandner | B29C 66/73921 264/248 |
| 2010/0237610 A1 | * | 9/2010 | Suigetsu | B29C 65/08 285/330 |

FOREIGN PATENT DOCUMENTS

| | | |
|---|---|---|
| JP | S5828312 | 2/1983 |
| NL | 68987 | 6/1951 |
| WO | 8501011 A1 | 3/1985 |
| WO | 2008028224 A1 | 3/2008 |

OTHER PUBLICATIONS

Extended European Search Report for Application No. EP12886230.7 dated Oct. 23, 2015; 20 pages.

* cited by examiner

METHOD FOR ATTACHING METALLIC FLANGES TO THERMAL PLASTIC DUCTS

BACKGROUND OF THE INVENTION

Exemplary embodiments of this invention generally relate to ducts and, more particularly, to fittings configured for use with re-enforced thermoplastic ducts.

In conventional duct assemblies, when a portion of a fitting or coupling is inserted into an end of a flexible duct, the material of the duct stretches around barbs of the fitting. Because the deformation of the duct is elastic, when the fitting is removed, the duct will return to its original size. When the duct stretches to receive the fitting, the compressive force of the duct material against the barbed surface of the fitting holds the fitting in position.

Flexible synthetic ducts, such as those made from synthetic rubber, are susceptible to deterioration as a result of heat, and permeability by the fluid conveyed through the duct, as well as other failures. As such, reinforced hoses or ducts constructed from thermoplastic materials, such as reinforced thermoplastic, for example, are being used in applications where flexible synthetic ducts are not suitable. A thermoplastic duct used in an aircraft must meet specific smoke, toxicity, and chemical requirements. Additional requirements of a duct configured for use on an aircraft are especially stringent because the operating environment of the duct may range from a hot and humid atmosphere, such as when the aircraft is on the ground, to a freezing, low pressure atmosphere when the aircraft is at extremely high altitudes. Ducts formed from reinforced thermoplastics, however, are difficult to couple and seal with conventional couplings and fittings because of the rigid nature of the thermoplastic material.

BRIEF DESCRIPTION OF THE INVENTION

According to one embodiment of the invention, a method is provided for connecting a fitting to a reinforced thermoplastic duct including inserting a first end of the fitting having a plurality of barbs into an end of the duct. A clamp is installed around the duct. The duct is heated to a temperature greater than a glass transition temperature of a thermal plastic material used to form the duct. The duct is restructured to include a plurality of protrusions positioned between the plurality of barbs of the fitting.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
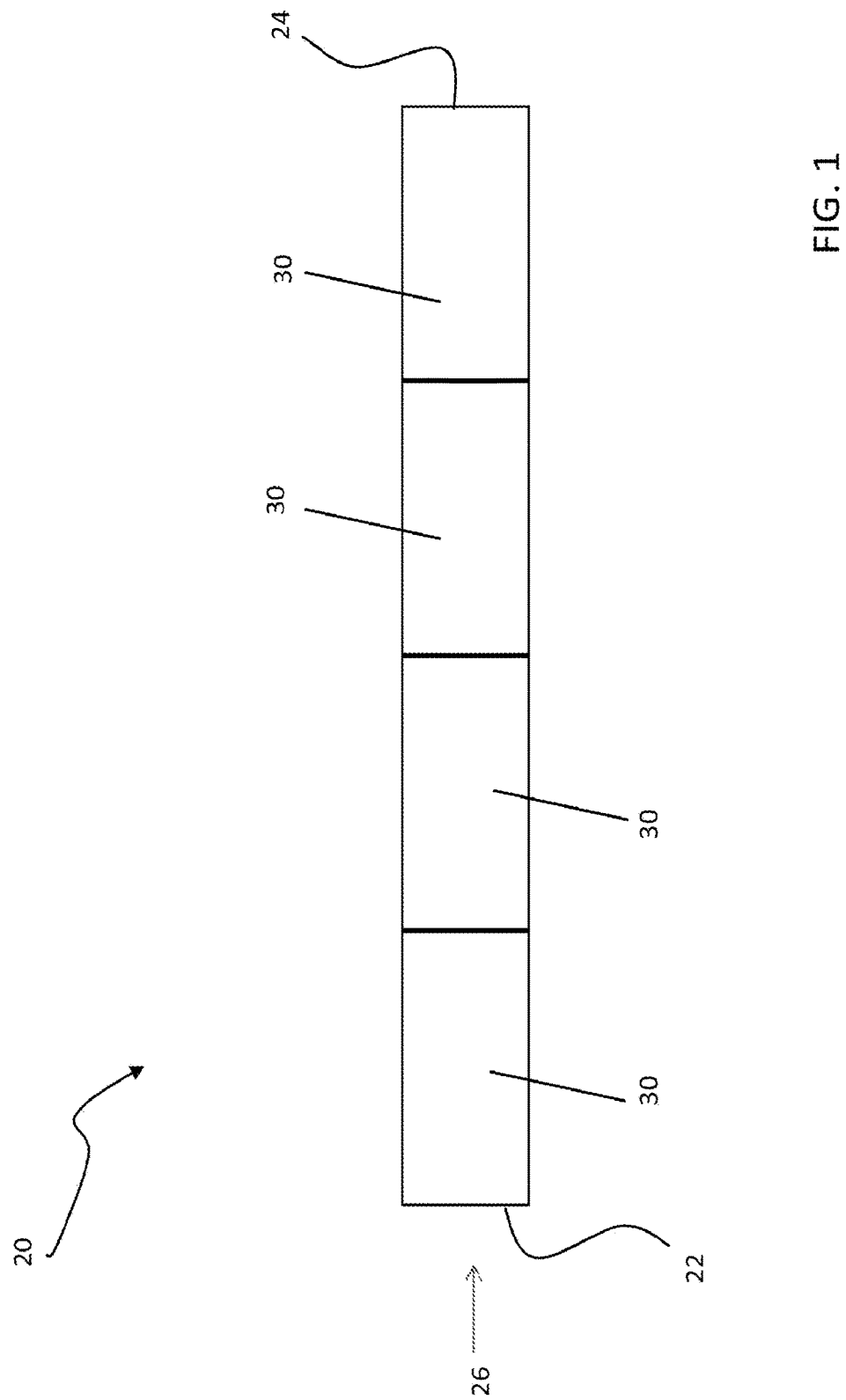
FIG. 1 is a side view of an exemplary known thermoplastic duct.

Referring now to FIG. 1, an exemplary reinforced thermoplastic duct 20 is illustrated. The duct 20 includes a plurality of duct segments 30 connected using conventional fittings (see FIG. 3) to define a continuous passage 26 extending from an inlet 22 to an outlet 24. Though the illustrated duct 20 is generally straight, the duct 20 may alternatively be generally curved or may include a combination of straight portions and curved portions. The duct 20 may be used in numerous applications in an aircraft including, but not limited to, in a fuel system or in an environmental control system in which air is delivered through the passage of the duct to provide heating, cooling, and ventilation to an aircraft cabin for example.

Figure 2:
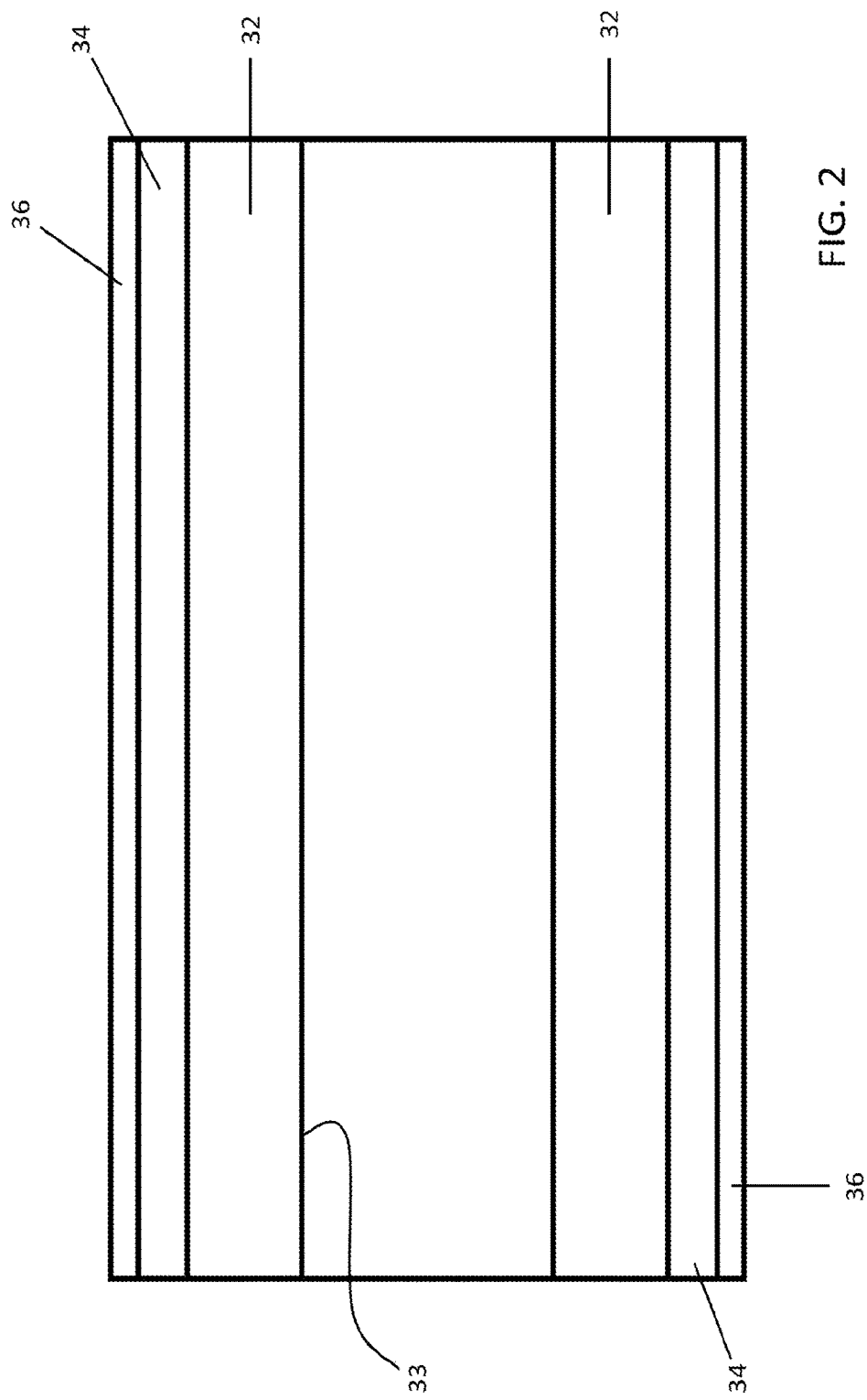
FIG. 2 is a cross-sectional view of a known thermoplastic duct segment.

FIG. 2 shows and example of a duct segment 30. In one embodiment, one or more of the segments 30 combined to create a duct 20 (FIG. 1) is formed at least partially from a thermoplastic material or elastomer. Thermoplastic materials are characterized by a transition to a plastic state when heated above a glass transition temperature and a return to a non-plastic state when cooled to a temperature below the glass transition temperature. In the illustrated one, the thermoplastic material forms a central core 32 of the duct segment 30. The duct segment 30 also includes a reinforcing material, such as a fabric or fibers of a glass, carbon, aramid, or other reinforcing materials for example. In one embodiment, the reinforcing material is formed integrally with the thermoplastic material. Alternatively, the reinforcing material is formed as a separate layer 34 adjacent the thermoplastic central core 32. In addition, the duct segment 30 may include an outer layer 36 made from an elastomeric thermosetting material that acts as a sheath or cover. Ducts 20 (FIG. 1) made of a reinforced thermoplastic material are more rigid than other known flexible ducts, such as those made of rubber, for example. Although a particular thermoplastic duct is illustrated and described in the disclosed embodiment, other configurations are within the scope of the present invention.

Figure 3:
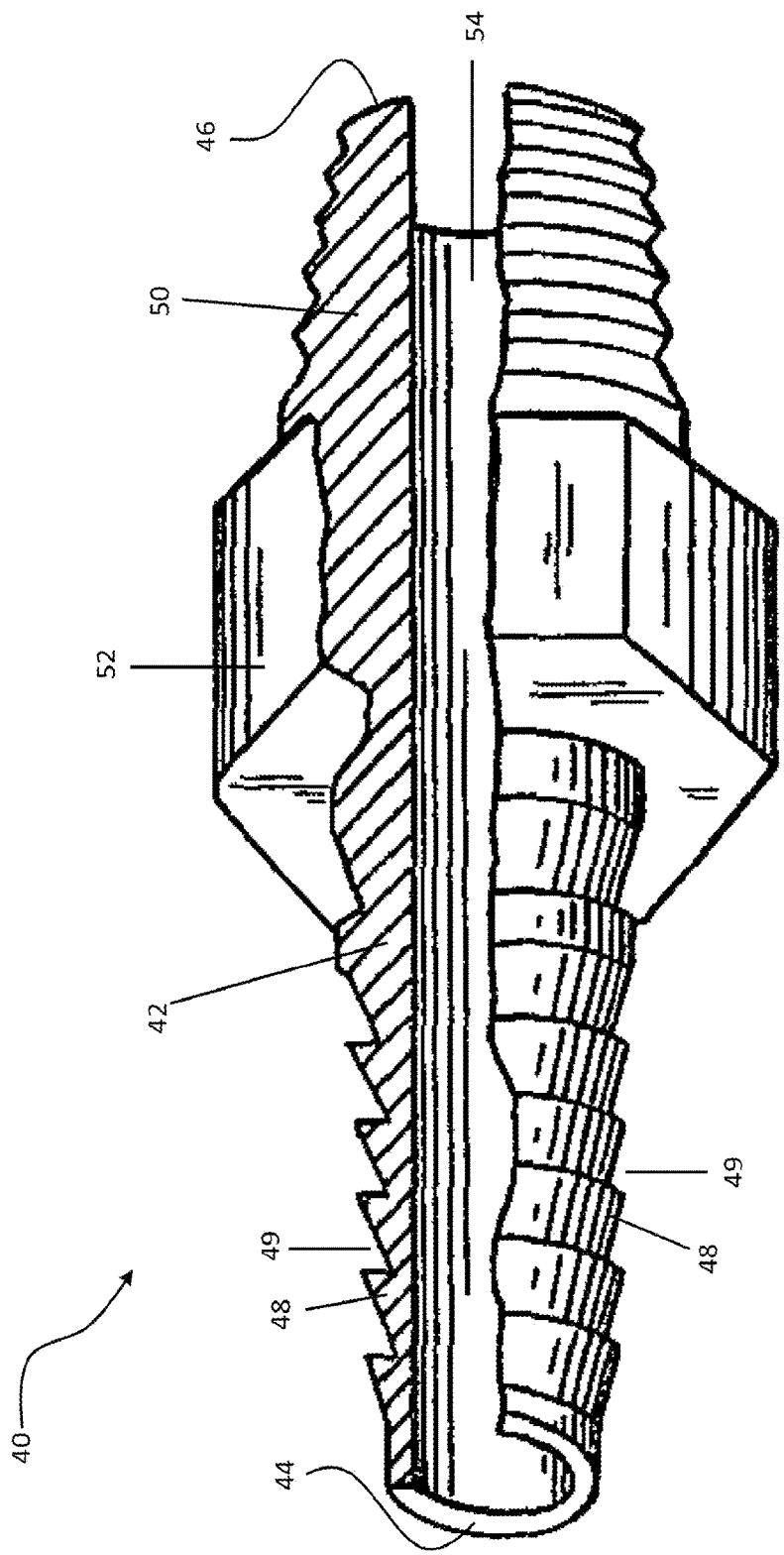
FIG. 3 is a perspective, partially cut view of an exemplary fitting.

FIG. 3 is an example of a conventional metal fitting 40 that may be used to connect a duct or duct segment to another element. The fitting 40 includes a stem member 42 having a series of serrations or barbs 48 formed around the periphery of a first end 44. These barbs 48 are inserted into and mate with the duct or duct fitting. The fitting 40 also includes a coupler 50, having for example a threaded second end 46 separated from the barbed end 44 of the stem member 42 by a nut-like wall region 52. The coupler 50 is configured to connect the second end 46 of the fitting 40 to another duct, or alternatively to a piece of equipment. A central bore 54 extends longitudinally through the entire length of the stem member 42. Although a particular fitting 40 is illustrated and described in the disclosed embodiment, other configurations of couplings or connectors are within the scope of the present invention.

With reference now to FIGS. 1-3, because reinforced thermoplastic ducts, for example duct 20, are more rigid than flexible ducts, the material of the thermoplastic duct 20 will not stretch or deform around the first end of a fitting, such as fitting 40 for example, when the stem member 42 of the fitting 40 is inserted into an end 22 of the duct 20. Consequently, the barbs 48 of the fitting 40 will not securely engage an interior surface 33 of the duct 20 if the fitting 40 is installed into the duct 20 using a conventional method.

Figure 4:
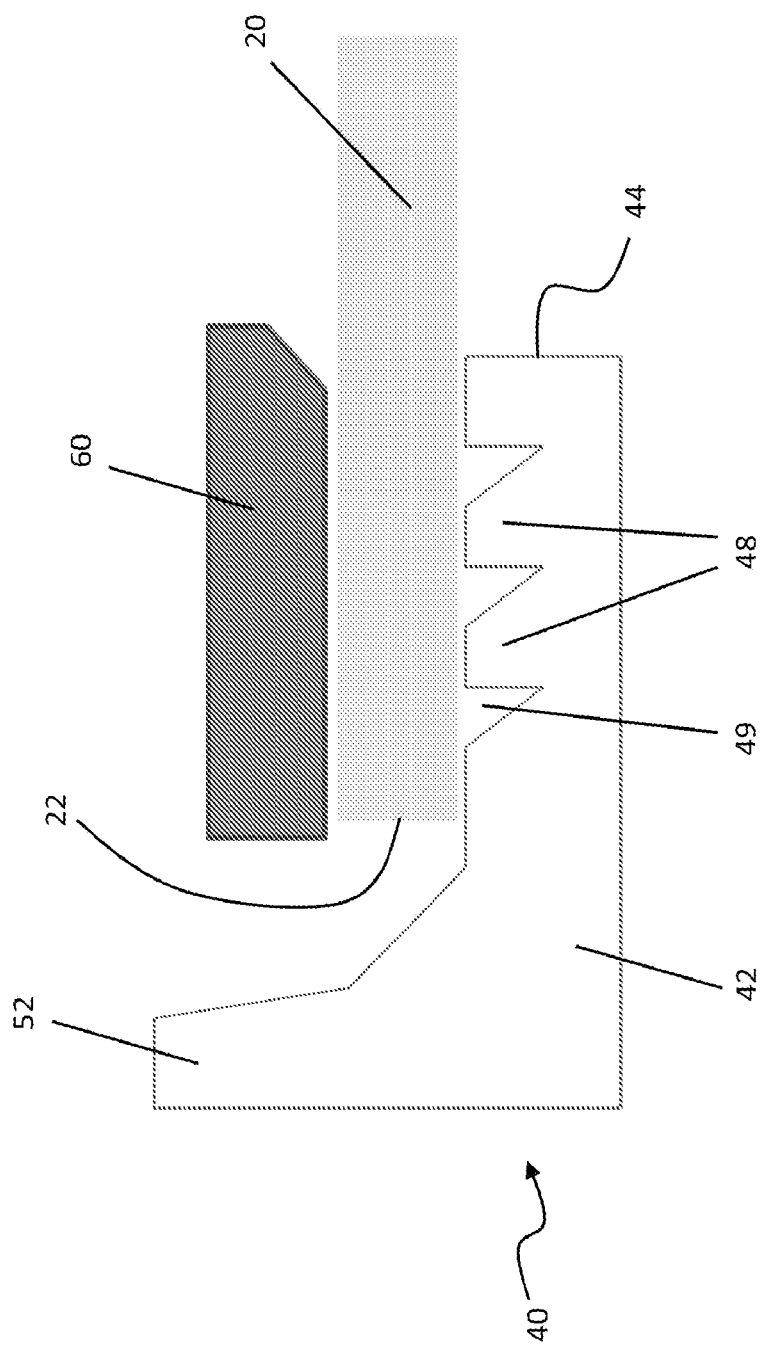
FIG. 4 is cross-sectional view of a thermoplastic duct and fitting assembly according to an embodiment of the invention.
Figure 5:
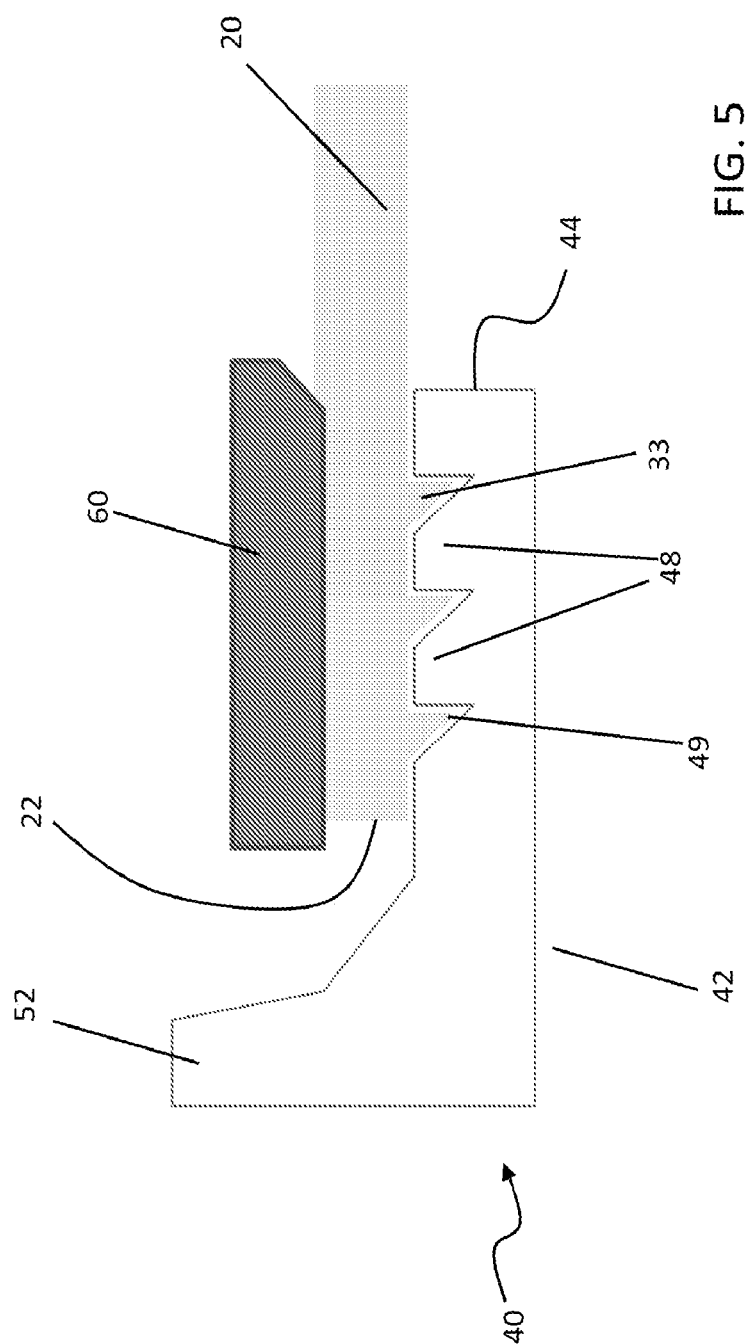
FIG. 5 is cross-sectional view of a thermoplastic duct and fitting assembly according to an embodiment of the invention.
Figure 6:
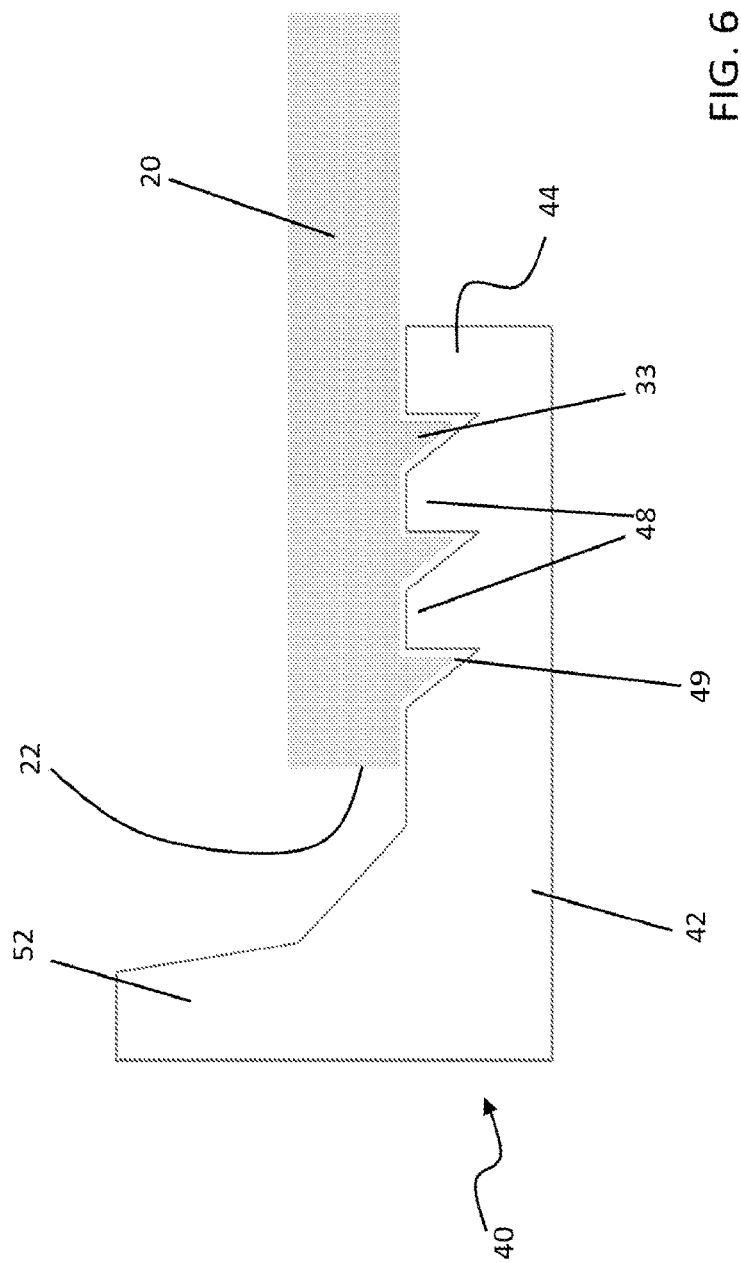
FIG. 6 is cross-sectional view of a thermoplastic duct and fitting assembly according to an embodiment of the invention.

Referring now to FIGS. 4-6, a method for attaching a fitting 40 to a rigid thermoplastic duct 20 is illustrated. The barbed first end 44 of the stem member 42 is inserted freely into a first end 22 of the duct 20. In one embodiment, the fitting 40 is selected such that the outer diameter of the first end 44 of the stem member 42 is about equal to the inside diameter of the duct 20. If the outer diameter of the first end 44 of the stem member 42 is too large, the rigid nature of the duct 20 will cause it to crack and break. When the first end 44 of the fitting 40 is inserted, the end 22 of the duct 20 does not deform as a result of the fitting 40. A known, generally circular clamp 60, such as a hydroflow clamp or a rigid clamp for example, is then installed around the periphery of the end 22 of the duct 20. The clamp 60, as shown in FIG. 4, is concentrically aligned with the first end 44 of the stem member 42 within the duct 20. The clamp 60 is configured to restrain any movement of the duct 20 relative to the fitting 40 by applying a compressive force to the duct 20 and the fitting 40.

The duct 20 is then heated to a temperature greater than the glass transition temperature of the thermoplastic material forming the duct 20, such as used in the central core 32 for example. In one embodiment, the temperature of the duct is increased by placing a heating element around the first end 22 of the duct 20. The glass transition temperature will vary depending on the type of thermoplastic material 32 used to form the duct 20. In one embodiment, the glass transition temperature of the thermoplastic material of the duct 20 is less than the melting temperature of both the metal fitting 40 and the clamp 60. Once the thermoplastic material reaches a temperature greater than its glass transition temperature, the pressure applied by the clamp 60 to the duct 20 causes material to flow towards the fitting 40. As a result, the thermoplastic material 32 flows into the grooves 49 between the barbs 48 of the fitting 40. By allowing the duct 20 to cool to a temperature less than the glass transition temperature while the pressure from the clamp 60 is still applied, the thermoplastic material 32 of the duct 20 is permanently restructured to include a plurality of protrusions 39 complementary to the grooves 49 between the barbs 48 of the first end 44 of the fitting 40. After the duct 20 has cooled to a temperature below the glass transition temperature, the clamp 60 is removed from the permanently restructured duct 20.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for connecting a fitting to a reinforced thermoplastic duct comprising:
    inserting a first end of the fitting having a plurality of barbs into an end of the duct, wherein a maximum external diameter of the first end is less than an initial minimum internal diameter of the duct;
    installing a clamp around the duct after inserting the first end into the end of the duct;
    heating the duct to a temperature greater than a glass transition temperature of a thermoplastic material used to form the duct after installing the clamp around the duct;
    restructuring the duct to include a plurality of protrusions positioned between the plurality of barbs of the fitting via the heating of the duct to the temperature greater than the glass transition temperature;
    allowing the duct to cool to a temperature below the glass transition temperature; and
    removing the clamp from the duct after the duct is cooled to the temperature below the glass transition temperature.

2. The method according to claim 1, wherein the clamp restrains movement of the duct relative to the fitting.

3. The method according to claim 1, wherein the clamp applies a compressive force the duct.

4. The method according to claim 1, wherein the clamp is installed concentrically around the end of the duct and the first end of the fitting.

5. The method according to claim 1, wherein the clamp has a melting temperature greater than the glass transition temperature of the duct.

6. The method according to claim 1, wherein the fitting has a melting temperature greater than the glass transition temperature of the duct.

7. The method according to claim 3, wherein the force applied by the clamp when the duct is heated to a temperature greater than a glass transition temperature causes the barbs of the fitting to dig into an interior surface of the duct and the duct to flow into a plurality of grooves formed between the plurality of barbs.

8. The method according to claim 1, wherein the plurality of protrusions are permanently formed in the duct.

9. The method according to claim 7, wherein the plurality of protrusions are complementary to the plurality of grooves.

10. The method of claim 1, wherein the fitting is formed from a metal material.

* * * * *